United States Patent Office 2,876,887
Patented Mar. 10, 1959

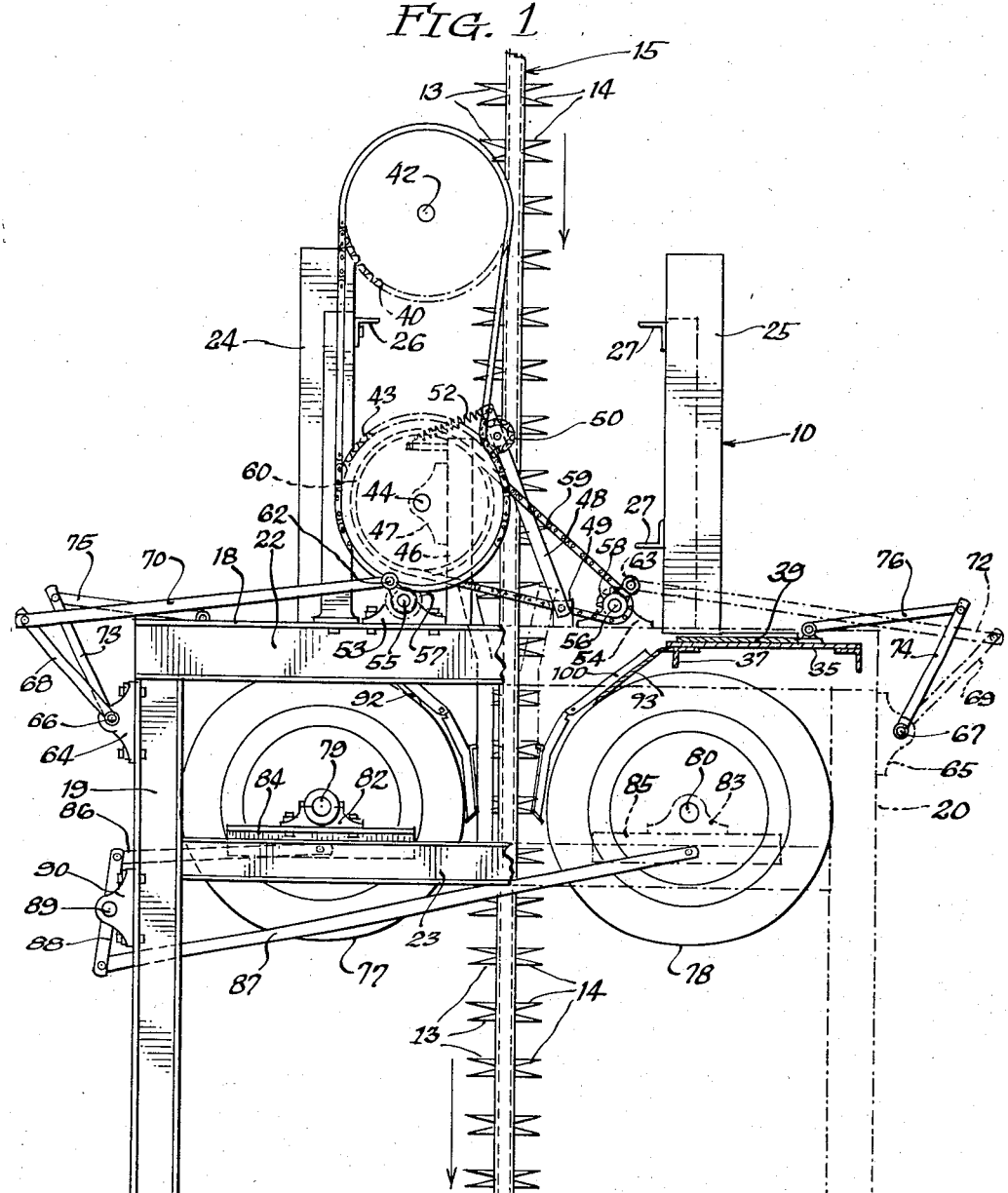

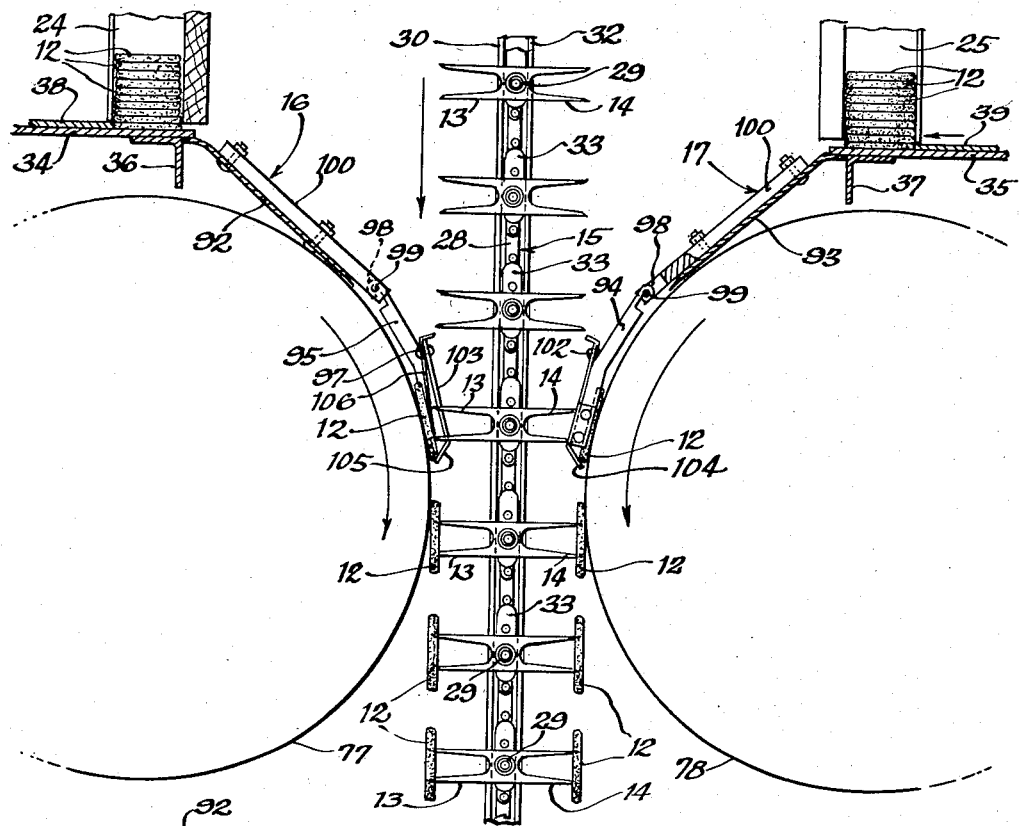
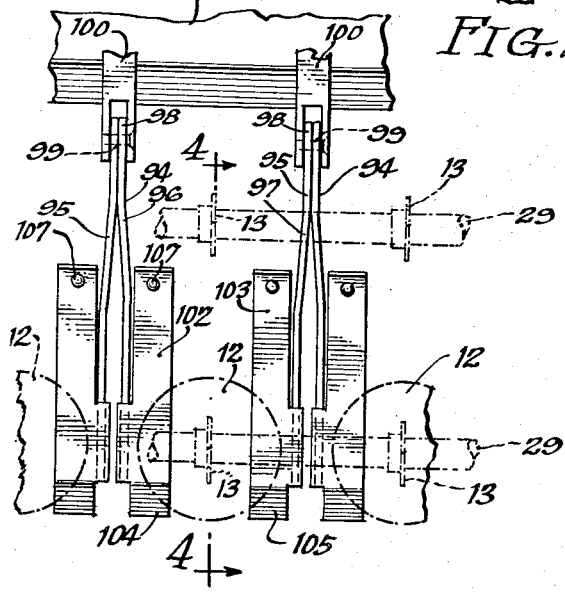
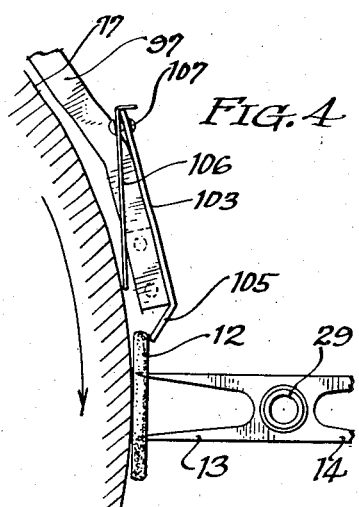

2,876,887

LOADING MECHANISM FOR COOKY APPARATUS AND THE LIKE

Nathan J. Watson, Sioux City, Iowa, assignor to Johnson Biscuit Company, Sioux City, Iowa, a corporation of Iowa Application March 29, 1957, Serial No. 649,525

12 Claims. (Cl. 198—26)

This invention relates to loading mechanisms for cooky coating apparatus and the like, and more particularly to loading mechanisms for use in effecting the initial securement of pieces of base material, such as the base cakes of cookies, on dip-coating equipment which is suited to continuous operation for extended periods.

The loading mechanism herein disclosed is related to, and useable in the place of, those shown in my United States Letters Patent No. 2,597,415, issued May 20, 1952, and entitled Loading Mechanism For Cooky Coating Apparatus and the Like, and United States Letters Patent No. 2,606,511, issued August 12, 1952, entitled Method and Apparatus For Dip-Coating Cookies, and in which I am a co-inventor with William R. Steingraber.

In addition to providing a loading mechanism adapted to effecting the initial securement of relatively fragile cooky fillers or base cakes on a dip-coating machine during continuing operation of the machine, it is an object of this invention to provide a loading mechanism which is effective in centering the position of engagement of the carrying elements of the machine with the base cakes.

As another object, this invention has within its purview the provision of a loading mechanism for impaling base cakes of cookies on the tangs of a dip-coating machine with the aid of holding devices for the base cakes which will release the impaled base cakes without loosening their engagement with the tangs.

My invention has for another object the provision of a loading mechanism for use with a trolley type of dip-coating machine embodying holding elements for releasably retaining base cakes which are to be dip-coated, which holding elements are positioned to center the base cakes with respect to carrying parts on the dip-coating machine, and each of which holding elements is constructed and arranged to center base cakes therein.

It is another object of my invention to provide a loading mechanism by which base cakes are releasably retained for loading onto a trolley type of dip-coating machine by being held between the smooth outer surface of a freely rotatable round drum and holding elements movable toward and from the drum surface for effecting releasable retention of the base cakes during their transfer to the dip-coating machine.

Other objects and advantages of the invention will be apparent from the following description and the accompanying drawings in which similar characters of reference indicate similar parts throughout the several views.

Referring to the two sheets of drawings:

Fig. 1 is a fragmentary front elevational view of apparatus embodying a preferred form of my invention with parts shown in their normal operating positions;

Fig. 2 is a fragmentary front sectional view of a portion of the structure shown in Fig. 1 and drawn to a larger scale than Fig. 1 to illustrate details of the embodied structure;

Fig. 3 is a fragmentary front elevational view of a portion of the structure depicted in Fig. 2; and Fig. 4 is a fragmentary side view of a portion of the structure illustrated in Fig. 3, and taken substantially as indicated by a line 4—4 and accompanying arrows in Fig. 3.

In the exemplary embodiment of this invention which is herein shown and described for illustrative purposes, a loading mechanism 10 is shown in an adaptation suited to the impalement of fillers or base cakes 12 on oppositely projecting tangs 13 and 14 of an endless chain conveyor 15, which conveyor is driven and carries the base cakes along a predetermined path for dip-coating and drying purposes. In the disclosed embodiment of the invention, and because the endless conveyor 15 has the oppositely projecting tangs 13 and 14 for carrying the base cakes 12 on its opposite sides, the loading mechanism embodies portions of similar general structure and disposed in opposed relationship to one another for effecting the loading of the base cakes on the opposite sides of the conveyor. In the disclosed apparatus and as depicted in Figs. 1 and 2, the conveyor 15 has a portion which extends in a substantially vertical direction between the left and right hand portions 16 and 17 respectively of the loading mechanism.

As shown in Fig. 2, the loading mechanism is supported on a frame 18 which includes supporting legs 19 and 20, upper cross members such as 22 and lower cross members such as 23. Hoppers 24 and 25 are mounted on the top of the frame 20 and carried by rails 26 and 27. The hoppers 24 and 25 are manually or otherwise loaded with base cakes from the top, and the base cakes gravitate through the hoppers as they are fed therefrom one-by-one to be impaled upon the tangs of the conveyor for dip-coating and drying.

In the disclosed apparatus, the conveyor has chains 28 at its opposite sides which extend through parallel paths and carry equally spaced cross bars 29 therebetween. The cross bars 29 each have a series of the oppositely projecting tangs 13 and 14 secured thereto in equally spaced relationship longitudinally of the bars. Thus, the tangs on each bar form rows extending laterally of the conveyor, and since the tangs are equally spaced and aligned on the bars of the conveyor, they are also disposed in equally spaced rows longitudinally of the conveyor. At the portion of the conveyor depicted in Fig. 2, the chain at at least one side of the conveyor passes between guide rails 30 and 32 to stabilize the conveyor at the loading position and to guide lugs 33 which are secured to the crossbars 29 and rotatably connected to the conveyor chains, thereby to hold the crossbars in positions such that the tangs are prevented from swinging and are held in their oppositely projecting positions with respect to the plane of the conveyor.

The hoppers 24 and 25 from which base cakes are supplied to the conveyor are disposed in a row on each side of the conveyor and extending laterally thereof with each hopper aligned with one of the longitudinal rows of tangs on the conveyor. Spaced below the hoppers 24 and 25 on each side of the conveyor are base blates 34 and 35 secured to and supported by means including angle strips 36 and 37 which are carried by the frame 18. The spacing between each base plate and the hopper is such that as the base cakes gravitate through the hopper, the bottom cake rests on the base plate and sufficient clearance is provided between the base plate and hopper for that bottom cake to be pushed forwardly from the bottom of the stack by a ram plate, such as 38 and 39, associated with each of the hoppers.

For operating the rams 38 and 39 to push base cakes from the hoppers in timed relationship to the movements of the conveyor, I have utilized a mechanism which is driven from the conveyor drive structure and which includes a sprocket 40 secured to and driven from a driven shaft 42, a second sprocket 43 carried by a shaft 44 in aligned relationship to the sprocket 42 and a driving chain 45 connecting the sprockets. The shaft 44 is supported relative to the frame 18 by a supporting frame structure 46 and bearing blocks such as 47 which are secured to the frame structure. An arm 48 is mounted at one end for swinging movement relative to a bracket 49 secured to the frame 18 and carries an idler sprocket 50 which latter sprocket is urged against the driving chain 45 between the sprockets 40 and 43 by resilient means 52 to keep the chain taut.

Bearing blocks such as 53 and 54 are secured to the top cross members 22 of the frame 18 on opposite sides of the conveyor 15 and rotatably support shafts 55 and 56 respectively. A sprocket 58 is mounted on and drivingly secured to the shaft 56 and is driven through a chain 59 from a sprocket 60 which is secured to and carried by the shaft 44, while the shaft 55 is driven by a sprocket 57 secured thereto and drivingly connected by a chain (not shown) from a sprocket the same size as the sprocket 58 on the shaft 56. A crank arm 62 is supported on, and driven from the shaft 55, and a crank arm 63 is secured to and driven by the shaft 56.

Bearing blocks 64 and 65 are secured to the supporting legs 19 and 20 respectively at opposite sides of the frame 18 and carry shafts 66 and 67 respectively for rotational movements. The shafts 66 and 67 have arms 68 and 69 respectively secured thereto and projecting radially therefrom. Driving links 70 and 72 respectively provide movable driving connections between the arms 68 and 69 at positions spaced from the shafts 66 and 67 and the crank arms 62 and 63, whereby continued rotational movements of the driven crank arms 62 and 63 effect periodic oscillatory movements of the shafts 66 and 67.

At positions aligned with each of the hoppers 24 and 25 on the opposite sides of the frame 18, the shafts 66 and 67 have arms 73 and 74 secured thereto and projecting radially therefrom. Links 75 and 76 are movably connected at their opposite ends to the arms 73 and 74 and to the ram plates 38 and 39 so that the oscillatory movements of the shafts 66 and 67 produce periodic reciprocating movements of the ram plates 38 and 39 to push base cakes from the bottoms of the respective hopper stacks in timed relationship to the movements of the conveyor.

Having means thus provided for feeding base cakes in timed relationship to the movements of the tangs 13 and 14 which project in opposite directions from the two sides of the moving conveyor, it is necessary to guide those base cakes to positions for impalement on the tangs and to releasably hold the base cakes for firm impalement at central positions on the base cakes and to effect release of the base cakes for movements with and on the conveyor without undue breakage of the base cakes.

For guiding portions of the base cake movements to positions of alignment with the tangs and for backing the base cakes while they are being impaled upon the projecting tangs, cylindrical drums 77 and 78 having smooth outer surfaces are utilized on opposite sides of the conveyor. The drums 77 and 78 are mounted on shafts 79 and 80 respectively, which shafts are supported for relatively free rotation in bearing blocks 82 and 83 respectively. The bearing blocks 82 and 83 are, in turn, secured to slide bars 84 and 85 respectively, and those slide bars are supported for sliding movement longitudinally of the lower cross members 23 of the frame 18. Such sliding movement of the slide bars 84 and 85 is utilized to effect movements of the drums 77 and 78 between operative cake backing positions adjacent opposite sides of the conveyor 15 and positions removed from the conveyor and in which the conveyor can be operated without the loading of base cakes thereon.

For convenience in effecting movements of the drums 77 and 78 between their loading and inoperative positions, the disclosed structure includes a link mechanism (shown in Fig. 1) in which links 86 and 87 each have one end movably connected to one of the slide bars 84 and 85. The other ends of the links 86 and 87 are movably connected to opposite ends of a crossbar 88, the mid portion of which is mounted on a shaft 89 which is rotatably supported in a bearing block 90 secured to one of the legs of the frame 18. When the crossbar 88 is in the relatively vertical position shown in Fig. 1, the drums are in their operative or loading positions, while movements of the crossbar 88 toward a horizontal position in a counterclockwise direction, as viewed in Fig. 1, effects sliding movements of both slide bars 84 and 85 and their respective drums away from the conveyor along the lower cross member 23.

Chutes 92 and 93 which are aligned with each of the hoppers 24 and 25 on the opposite sides of the conveyor 15 and which are also aligned with the longitudinal rows of tangs 13 and 14 on the conveyor 15 extend downwardly from the base plates 34 and 35 to positions adjacent the surfaces of the drums 77 and 78 respectively, and the ends of the chutes terminate above the horizontal center lines of the drums. Thus, base cakes pushed from the hoppers by the rams 38 and 39 slide downwardly along the chutes 92 and 93 to aligned positions on the surfaces of the drums. Preferably the drums turn with sufficient freedom that the weight of base cakes which may tend to stick to the drum surfaces will effect rotational movements of the drums to bring the base cakes into positions for engagement with the tangs 13 and 14 on the conveyor.

For holding the base cakes temporarily at positions for centered engagement of the conveyor tangs therewith during impalement of the cakes on the tangs, I have provided pairs of movable cake retaining elements 94 and 95 adjacent each drum and directly below each of the chutes 92 and 93, which movable elements are disposed in rows substantially parallel to the axes of the respective drums 77 and 78 and above the diametrical plane extending through the axes of the drums at positions such that base cakes retained thereby will be centrally engaged by the conveyor tangs. Each pair of cake retaining elements has a pair of downwardly extending supporting arms 96 and 97, the upper ends of which have hook portions 98 thereon which are hooked over supporting means such as retaining screws 99, which latter screws are secured to brackets 100 on the lower ends of the chutes 92 and 93.

Secured to the lower ends of the arms 96 and 97 are retaining strips 102 and 103 respectively which extend toward one another in opposed relationship from the respective arms and are normally spaced apart, as well as being on the outer surfaces of the arms, so that they are normally spaced outwardly from the surfaces of the drums. At their lower ends, the retaining strips 102 and 103 have portions 104 and 105 which are disposed in obtuse angular relationship to the upper portions of the retaining strips and extend inwardly toward the surfaces of the drums. These end portions 104 and 105 serve as stops for arresting downward movements of the base cakes along the surfaces of the drums and also serve as cam surfaces for effecting outward movements of the retaining elements, including the arms 96 and 97 and the retaining strips 102 and 103 as a result of engagement with the base cakes after they have been impaled upon and are movable with the tangs of the conveyor.

For assisting the retaining functions of the retaining strips 102 and 103 in holding the base cakes firmly against the drum surface during impalement and for providing such action in a structure having flexibility which allows the base cake to move without material possibility of breakage, fingers such as 106 (Figs. 2 and 4) are movably suspended from the upper ends of the retaining strips by fastening means such as pins 107 having riveted end portions. The fingers 106 loosely engage the riveted pins 107 and normally gravitate to positions such that their lower ends are closely adjacent the surfaces of the respective drums. The lower end portions of these fingers engage the outer faces of the base cakes and tend to hold them against the drum surface, while affording sufficient freedom of movement of the base cakes that they gravitate to centered positions in which they engage both of the retaining strips of a pair.

It is to be noted that in the downward gravitational movements of the base cakes, the positions of the lower end portions of the retaining strips determine the positions of the base cakes during their initial impalement, and that the base cakes are laterally centered by engagement with each of a pair of the end portions of retaining strips which are in spaced relationship. The spacing of the retaining strips and arms of each pair of retaining elements also affords free space for the passage of the tangs as the conveyor progresses along its path of movement.

From the foregoing description and reference to the accompanying drawings, it may be readily understood that I have provided a loading mechanism for effecting the impalement of cooky base cakes and the like upon the conveyor tangs of dip-coating apparatus, which mechanism embodies smooth surfaces over which the base cakes are fed in timed relationship to the conveyor, the base cakes being effectively retained in positions for centered alignment with the conveyor tangs by relatively light weight and readily movable retaining elements having parts for both centering and holding the base cakes therein and also cam surfaces for producing the necessary movements for release of the impaled base cakes without the exertion of forces through the impaled base cakes which are apt to cause the breakage of any appreciable proportion thereof.

It is understood that the foregoing description is merely illustrative of a preferred embodiment of the invention and that the scope of the invention is not to be limited thereto but is to be determined by the appended claims.

1. In combination with a main conveyor for dip-coating base cakes and including power driven conveyor means having tangs thereon and projecting therefrom at positions to form rows extending both laterally and longitudinally of the conveyor means, a loading mechanism including hopper means for carrying a supply of base cakes, a cylindrical drum having a smooth outer surface and supported for free rotation relative to an axis extending in substantially parallel relationship to the lateral rows of tangs and substantially normal to the longitudinal rows of tangs on the conveyor means, said drum being normally disposed at a position in which a longitudinal portion of the outer surface is in close proximity to the projecting ends of the tangs, chute means extending downwardly from the hopper means toward the upper portion of the drum surface near the conveyor means at positions aligned with the longitudinal rows of tangs for guiding base cakes from the hopper means to the drum surface, and means aligned with the lower ends of the chute means and movable from and toward the drum surface for releasably retaining the base cakes in contact with the drum surface at positions above said longitudinal portion of the drum.

2. In a combination as defined in claim 1, means for moving base cakes from the hopper means to the chute means in timed relationship to the movement of the conveyor means.

3. In a combination as defined in claim 1, said means for releasably retaining the base cakes in contact with the drum surface having a cam surface thereon at a position for engagement by a base cake retained therein for moving the releasable retaining means away from the drum to release the base cake after said base cake is engaged by one of the tangs.

4. In a combination as defined in claim 1, said means for releasably retaining the base cakes in contact with the drum surface having lower end portions separated longitudinally of the drum for retaining the base cakes at a centered position therebetween.

5. In a combination as defined in claim 1, the distance between said longitudinal portion of the surface of the drum and the projecting ends of the tangs when the tangs are substantially aligned with a diametrical plane of the drum being less than the thickness of one of the base cakes.

6. In combination with a main conveyor for dip-coating base cakes and including power driven conveyor means having tangs thereon and projecting therefrom at positions to form rows extending both laterally and longitudinally of the conveyor means, a loading mechanism including a cylindrical drum having a relatively smooth outer surface and supported for free rotation relative to an axis extending in substantially parallel relationship to the lateral rows of tangs and substantially normal to the longitudinal rows of tangs on the conveyor means, said drum being normally disposed at a position in which the projecting ends of the tangs of each lateral row come into close proximity to the drum surface when the tangs of the row are aligned with a diamerical portion of the drum, means for feeding base cakes onto the drum surface in timed relationship to movements of the conveyor means at positions above said diametrical portion of the drum and aligned with the longitudinal rows of tangs, and means separate from the drum and supported for movements from and toward the drum surface at a position above said diametrical portion of the drum for releasably retaining base cakes in contact with the drum at positions for engagement by said tangs.

7. In a combination as defined in claim 6, the last mentioned means including parts separated laterally of the conveyor means and positioned so that the tangs pass therebetween.

8. In a combination as defined in claim 6, the last mentioned means including parts for engaging opposite side portions of the base cakes for centering the base cakes therebetween.

9. In a combination as defined in claim 6, the last mentioned means having a cam surface thereon at a position for engagement by a base cake retained thereby, and said cam surface being disposed for engagement with a base cake to effect movement of the said means away from the drum surface to release the base cake when the said base cake is engaged by one of the tangs.

10. In a loading mechanism for effecting the impalement of base cakes and the like upon projecting tangs of a conveyor means, the combination comprising, a cylindrical backing drum having a substantially smooth outer surface defining an arcuate path along which the base cakes are moved by gravity to a position for impalement by said projecting tangs, and means separate from the backing drum for releasably retaining the base cakes against the backing drum at said position for impalement until moved therefrom by the tangs, said means comprising an element supported for swinging movement from and toward the drum surface and normally biased toward the drum surface, and means for moving said element outwardly from the drum surface to release the base cake retained therein.

11. In a loading mechanism as defined in claim 10, said element having laterally spaced parts between which the base cakes are centered and between which the tangs move.

12. In a loading mechanism as defined in claim 10, said elements comprising spaced fingers having end portions curved toward the drum.

References Cited in the file of this patent
UNITED STATES PATENTS 2,606,511   Watson et al. _____ Aug. 12, 1952
2,792,922   Malhiot _____ May 21, 1957